Figure 1:
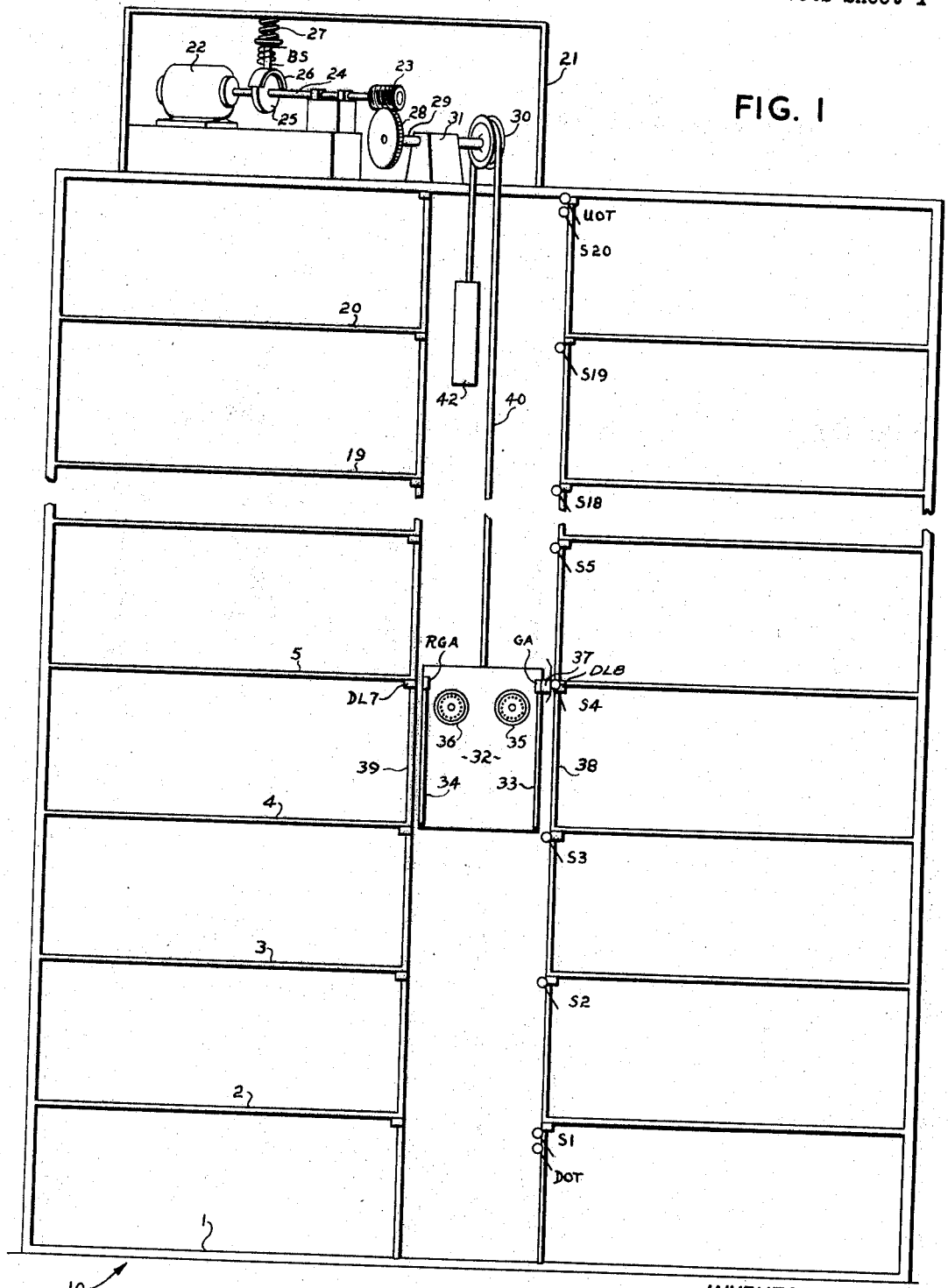

Sept. 19, 1967     J. A. GINGRICH ETAL     3,342,289
CONTROL SYSTEM FOR AN ELEVATOR OR DUMBWAITER
Filed March 3, 1964     6 Sheets-Sheet 1

INVENTORS
J. A. GINGRICH
G. A. HOLLAND
BY: Maybee & Legris
ATTORNEYS

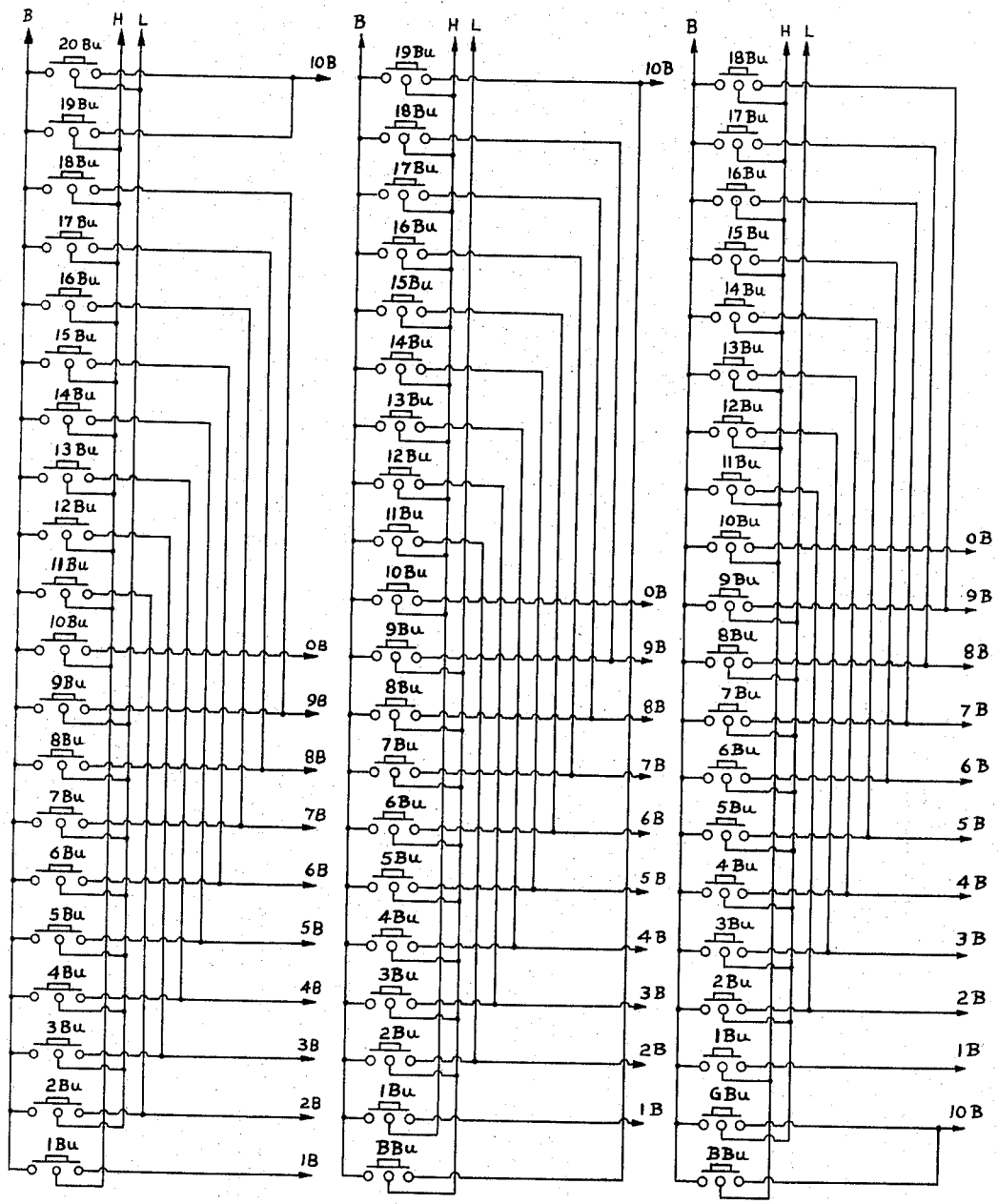

Sept. 19, 1967 J. A. GINGRICH ETAL 3,342,289
CONTROL SYSTEM FOR AN ELEVATOR OR DUMBWAITER
Filed March 3, 1964 6 Sheets-Sheet 5

INVENTORS
J. A. GINGRICH
G. A. HOLLAND

BY Maybee & Legris
ATTORNEYS

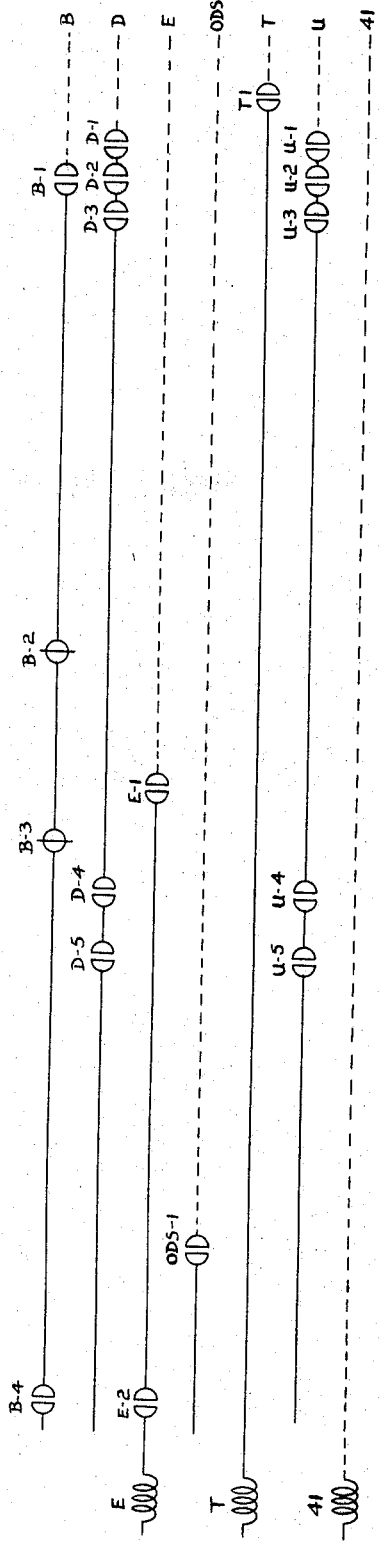
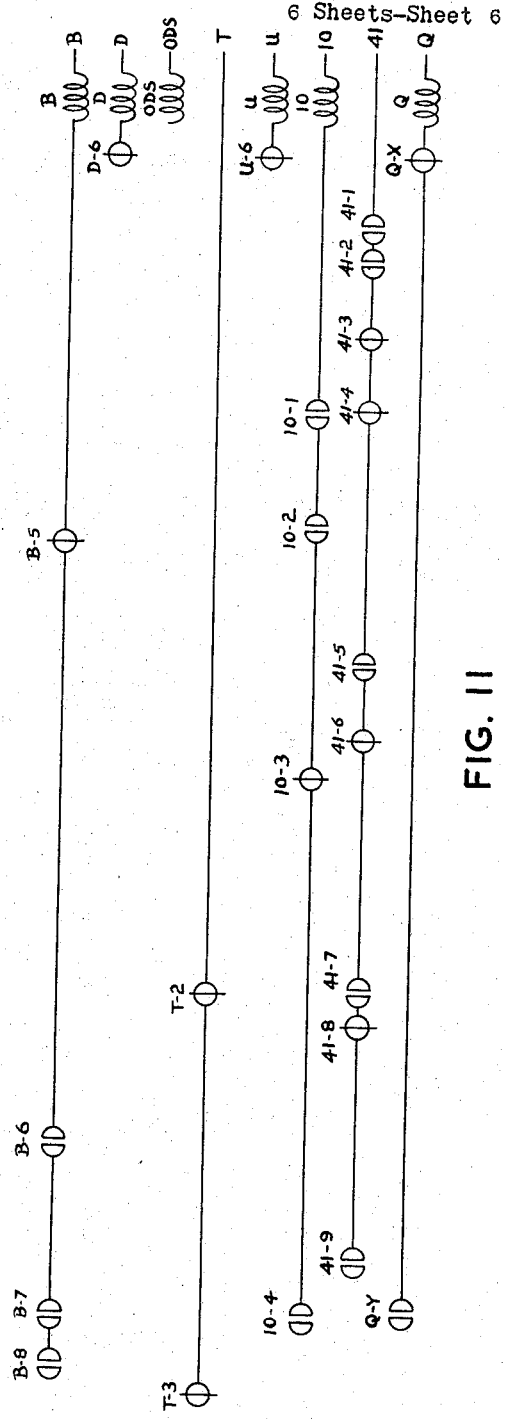
FIG. 10
FIG. 11

United States Patent Office 3,342,289
Patented Sept. 19, 1967

3,342,289
CONTROL SYSTEM FOR AN ELEVATOR OR DUMBWAITER
John A. Gingrich and Gordon A. Holland, Toronto, Ontario, Canada, assignors to Turnbull Elevator Limited, Toronto, Ontario, Canada, a company
Filed Mar. 3, 1964, Ser. No. 348,929
14 Claims. (Cl. 187—29)

This invention relates to an electrical control system for a car movable by traction means between a plurality of spaced apart stations. The invention is particularly applicable to the control of electric elevators and especially to the control of electric freight elevators of the type commonly known as "dumbwaiters." The word car as used herein is intended to include any passenger or freight carrying conveyance.

Dumbwaiters are normally controlled by a system which is known as "full call and send push-button control." This type of control system requires one button at each landing to call the car of the dumbwaiter and a plurality of send buttons equal to the number of landings served by the car, less one. That is to say, in an installation having ten landings, for example, there will be ten buttons at each floor, one call button and nine send buttons. Moreover, if the car has front and rear entrances with corresponding doors at each landing, there will be ten buttons at each door and therefore twenty buttons per landing. A control system of this type has one relay per floor to record the calls placed, even though the system will only accept one call at a time.

The "full call and send push-button control" allows the car to be called to any floor by operation of the call button on that floor and allows the car to move from any floor to any other floor by operation of the appropriate send button on the departure floor. Collective control is undesirable on a dumbwaiter since it would allow the interception of loads between despatch and receipt with the consequent intermingling of loads which would cause confusion.

The object of the present invention is to provide an electrical control system having a reduced number of relays and push buttons thus requiring less wiring than the "full call and send push-button control."

The invention provides a control system which has only one push-button at each landing door opening and a manually operable impulse-sending device in the car for despatching the car to the desired floor after it has been loaded. Features of the system to be described are the provision of means to prevent the car moving away from its destination in response to a further call before a predetermined time interval has elapsed to allow the gates on the car to be opened; the provision of means whereby the car may not be called to another landing while the car gates are open; and the provision of cancelling buttons in the car to cancel a call made by the impulse-sending device before the car gates have been shut.

Figure 2:
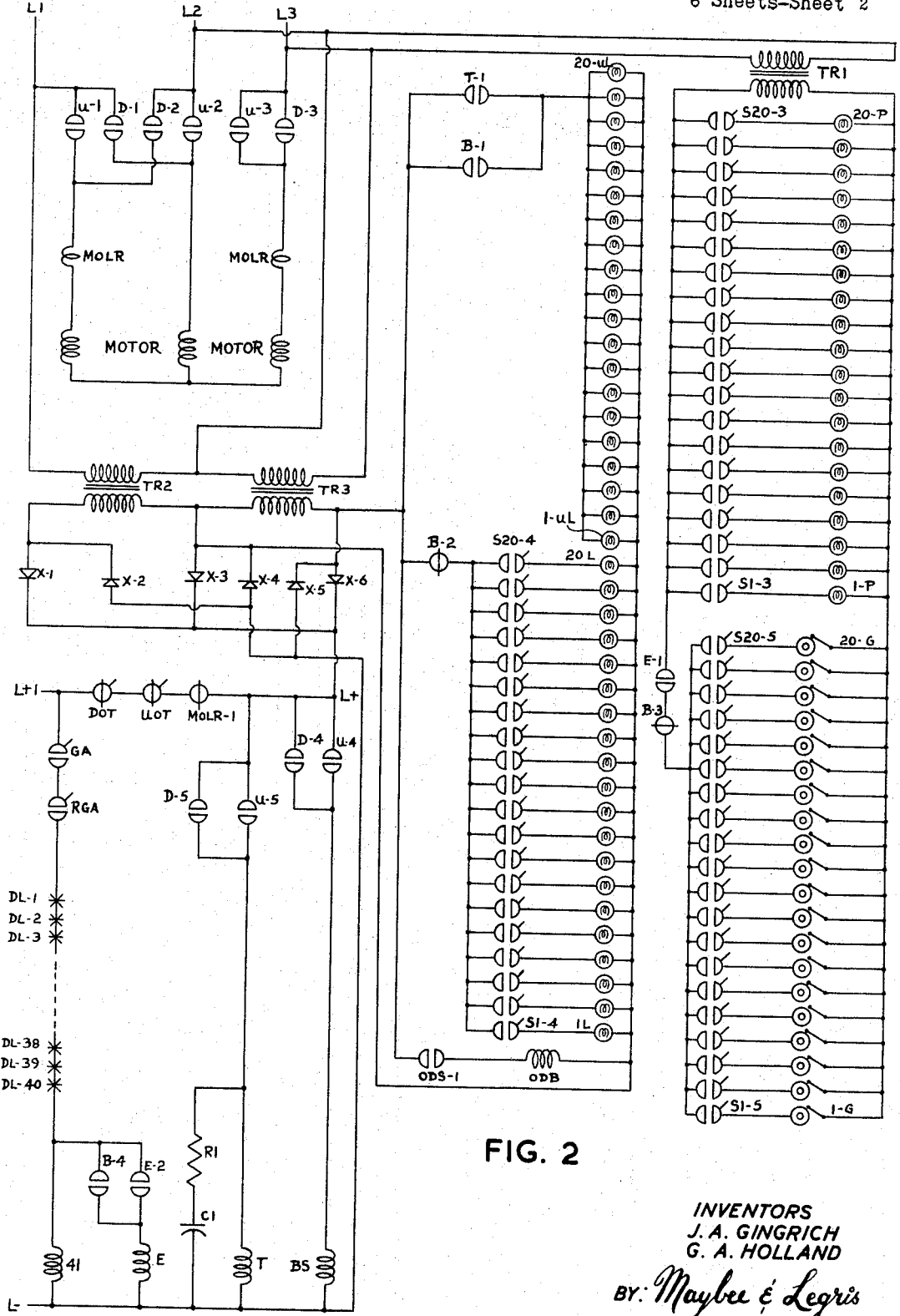
Figure 3:
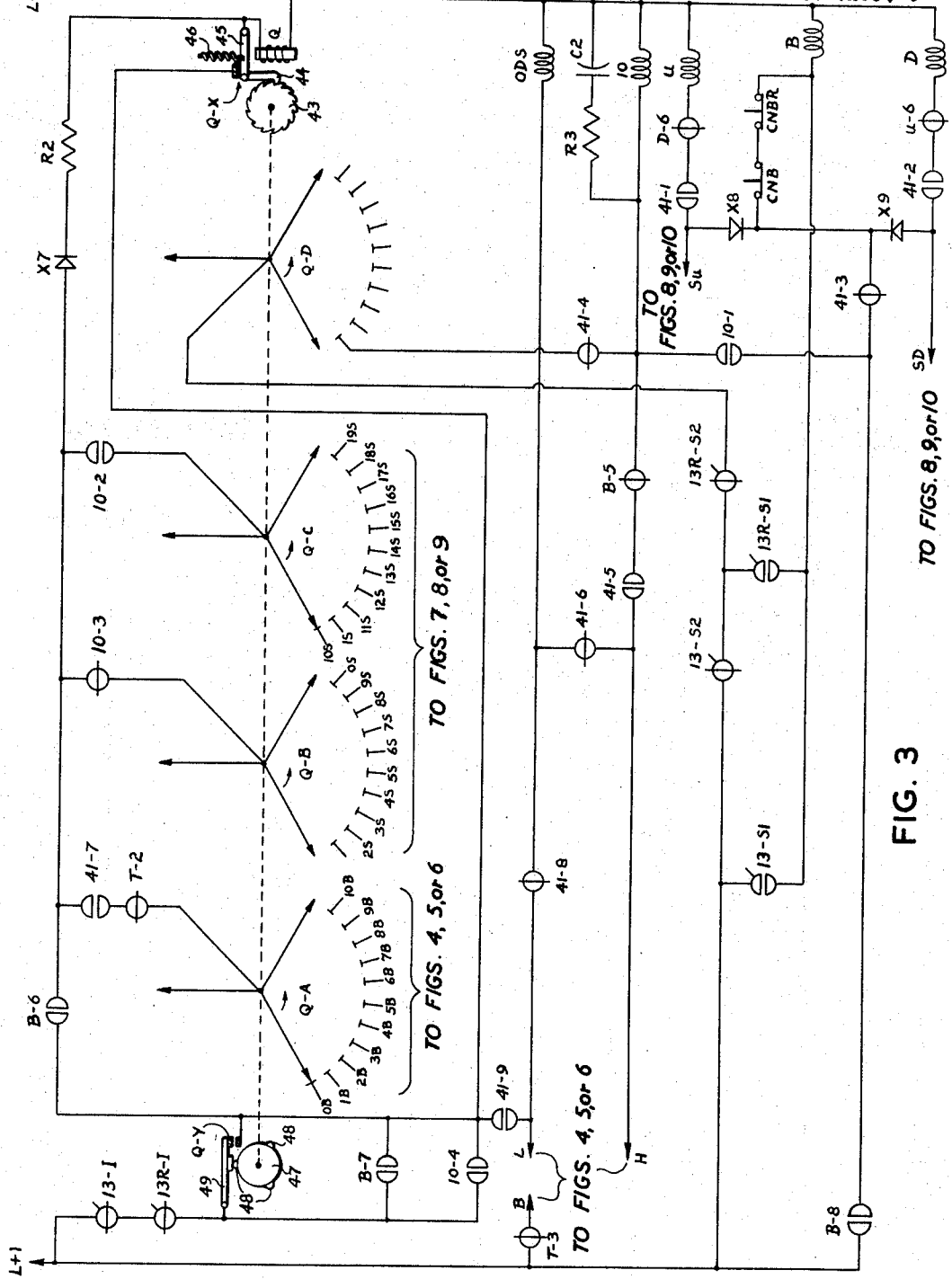
Figure 7:
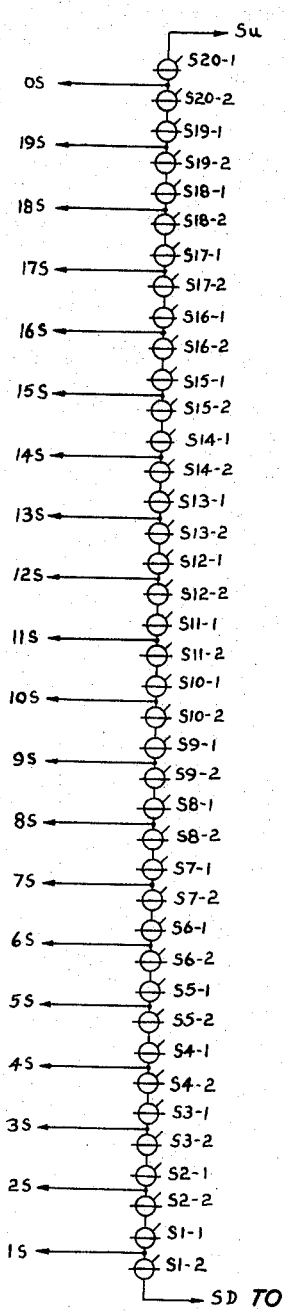
Figure 8:
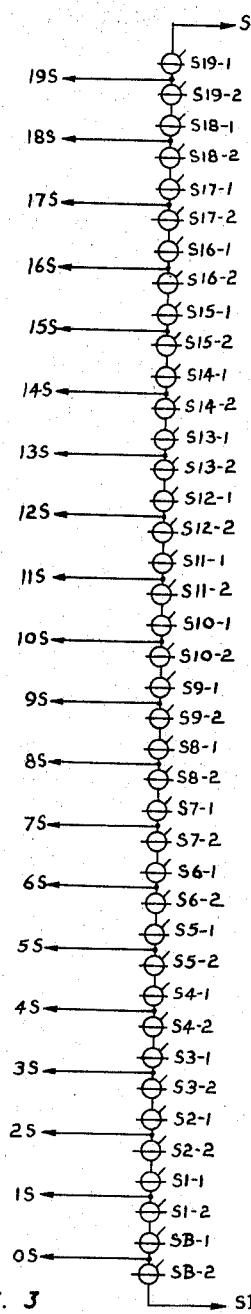
Figure 9:
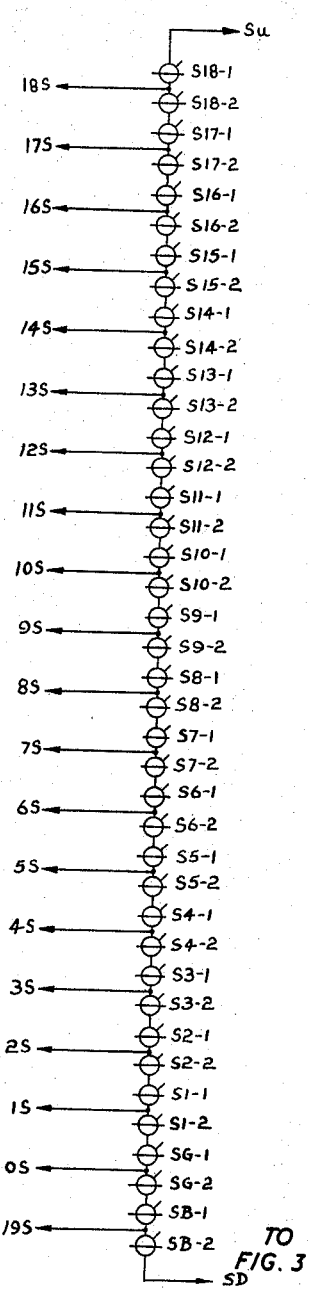

The invention will be described by way of example with reference to the accompanying drawings which show a control system for a dumbwaiter and in which like reference indicate like parts in the several views and in which:

FIGURE 1 is a diagram showing the physical arrangement of the dumbwaiter and some of the switch gear, FIGURES 2 and 3 together constitute a circuit diagram of the control system, FIGURES 4, 5 and 6 show three different ways of wiring the call buttons in the system, FIGURES 7, 8 and 9 show three different ways of wiring the hatch-way switches in the system, FIGURE 10 is a distribution diagram for FIGURE 2, and FIGURE 11 is a distribution diagram for FIGURE 3.

Referring now to FIGURE 1, there is shown diagrammatically a building 10 having 20 floors some of which are indicated generally at 1, 2, 3, 4, 5, 19 and 20. Mounted in a penthouse 21 on the roof of the building is a hoist motor 22 which drives a worm 23 via a shaft 24. Mounted on the shaft 24 is a brake drum 25 which co-operates with a brake shoe 26. The brake shoe is normally forced against the disc 25 by a spring 27 and a solenoid BS may be energised to lift the brake shoe 26 from the disc to allow the shaft 24 to rotate. Mating with the worm 23 is a pinion 28 mounted on a shaft 29 which, at its other end, carries a pulley 30; the shaft is supported in a bearing block 31.

A dumbwaiter car is indicated at 32 and has front gates 33 and rear gates 34. Mounted within the car adjacent to the front and rear gates respectively are telephone type dials 35, 36. Also mounted on the car above the gates 33, 34 are front and rear gate switches GA and RGA respectively. The car is provided with a cam 37 which has a length twice the stopping distance of the car and is arranged to co-operate with hatch-way switches, one switch being provided at each floor and being indicated at S1, S2, etc. Each of the hatch-way switches carries a cam follower which is engageable by the cam 37 when the car is at a floor, engagement of the cams operating the switch. Adjacent to the top of the building is an up-over-travel switch UOT and adjacent to the bottom of the building is a down-over-travel switch DOT. The cam 37 comes into contact with the over-travel switches if the car moves too high up the shaft or too low down the shaft respectively. The switches UOT and DOT are normally closed unless opened by the cam 37 on the car.

At each floor are provided two sets of doors, the front set being indicated at 38 and the rear set being indicated at 39. Associated with the doors are door-lock switches which are open when the doors are open and closed when the doors are closed. There are therefore two door-lock switches per floor, one switch for the front door and one switch for the rear door. The doors which are shown are on the fourth floor and therefore have door lock switches DL7 and DL8. Similarly, the first floor doors have door-lock switches DL1 and DL2 and the twentieth floor doors have door-lock switches DL39 and DL40. The car is suspended from a cable 40 which passes over the pulley 30 and which carries at its other end a counterweight 42.

The hatch-way switches S1, S2 ... S20 each have five pairs of contacts thus switch S1, has five pairs of contacts, S1–1, S1–2, S1–3, S1–4, and S1–5. Normally, when a car is not at the first floor, the contacts S1–1 and S1–2 are closed and the remainder of the contacts are open. When a car arrives at the first floor and the cam 37 operates the switch S1, then the contacts S1–1 and S1–2 are opened and the remainder of the contacts are closed. Similarly, for the remainder of the switches; each of the first and second contacts are normally closed but are opened by the presence of the car at that floor, and the third, fourth and fifth contacts are normally open and are closed by the presence of the car at that floor.

The telephone type dials 35, 36 in the car each have one set of impulse contacts and two sets of shunt contacts. The impulse contacts of the dial 35 are shown at 13–I (in FIGURE 3) and the shunt contacts at 13–S1 and 13–S2. When the dial is unactuated, the shunt contacts 13–S1 are open and the shunt contacts 13–S2 are closed. As the dial is actuated, contacts 13–I, which are normally closed, open as the dial is returning to its off position and, in well known manner, open once for each unit in the number dialed. For all positions of the dial except the off position, the contacts 13–S1 are closed and the contacts 13–S2 are open. The dial 36 has contacts 13R–I, 13R–S1 and 13R–S2 similar to the contacts 13–I, 13–S1 and 13–S2. The operation of the contacts on the dial 36 are similar to those on the dial 35. The dials provide manually operable sending devices.

Referring now to FIGURES 2, 3, 10 and 11, the circuit includes the relays shown in FIGURES 10 and 11 having the contacts which are shown in FIGURES 10 and 11 in positions which they assume when the relay with which they are associated is de-energized. The relay which is shown at Q is in fact the coil of a stepping switch which has four levels indicated at Q–A, Q–B, Q–C and Q–D in FIGURE 3, each level having ten contacts and the wipers of the levels being ganged to rotate in synchronism. The stepping switch shaft has a ratchet 43 operated by a pawl 44 which is in turn operated by a pivoted armature 45. A spring 46 is secured to armature 45 and tends to lift the pawl 44 and thus to close the contacts Q–X. The switch shaft also carries a cam 47 having three protuberances 48 arranged to contact a pivoted bar 49 which opens and closes the contacts Q–Y.

Referring to FIGURE 2, a gong is provided at each landing to signal the arrival of the car, the gongs being indicated at 1–G, 2–G . . . 20–G. At the main or first floor landing is provided a panel containing position lights 1–P, 2–P . . . 20–P, which indicate the position of the car. At each floor is an in-use light indicated at 1–UL, 2–UL . . . 20–UL which are illuminated at all floors when the car is in use and at each floor is also provided a car-here light indicated at 1L, 2L . . . 20L. The power for the circuit is provided from a three phase supply L1, L2, L3 and low voltage A.C. power for operating the position lights and the gongs is taken through a transformer TR1 from one phase of the supply.

Transformers TR2 and TR3 are placed across the three phase supply to produce a low voltage supply. A low voltage A.C. supply is taken from across the transformer TR3 to run the circuits containing the in-use lights and the car-here lights, and a rectifier bridge X–1, X–2, X–3, X–4, X–5 and X–6 is provided to produce rectified low voltage D.C. to operate the remainder of the circuit.

If the car is considered to be at the tenth landing with the car gates closed and with the landing doors closed then the relay 41 will be energized through the motor overload relay contact MOLR–1, the up-over-travel switch UOT, the down-over-travel switch DOT, the front gate switch GA, the rear gate switch RGA and the door lock switches at all floors, DL–1 to DL–40. If now a call button wired to the wire L, e.g. the button on the eighth floor, 8Bu in FIGURE 4, is pressed, the coil Q of the stepping switch will be energised through the contacts T–3, the push button 8Bu, contacts 41–9 and Q–X. As it is energized the whole voltage between the lines L+1 and L— will be applied across the coil. As the coil Q is energized the armature 45 will be pulled downwardly and the contacts Q–X will open. The coil Q will then become de-energised and the spring 46 will pull back the armature so that the contacts Q–X close. The pawl 44 will thus rotate the ratchet wheel 43 one notch as the armature lifts and the wipers on all the levels of the switch will step in synchronism. The switch will continue to step until the wiper on level Q–A arrives at the contact 8B which is connected to the push button 8Bu, the coil Q is then held energised so that the switch is prevented from rotating further. The coil Q is held energised through the contacts T–3, the button 8Bu, the contact 8B on level A on the stepping switch, contacts T–2, contacts 41–7, rectifier X7, and resistance R2. The current through the coil is now dropped by the resistance R2 so that the coil may be held energised without overheating. Simultaneously, the relay B is energised through the contacts T–3, the button 8Bu, the contact 8B on the level A of the stepping switch, the contacts T–2, the contacts 41–7, the contacts 10–3, the wiper of level B of the stepping switch, the contact 8S, through the contacts S8–2 of the hatch-way switch S8 (see FIGURE 7), the switches S7 to S1 inclusive, the line SD, the rectifier X9 and concelling buttons CNB and CNBR. The signal fed into the series of hatch-way switches between the contacts S8–1 and S8–2 is prevented from moving up the series and along the line SU since the presence of the car at the tenth floor opens the contacts S10–1 and S10–2 and breaks the circuit. Moreover the signal passing through rectifier X9 is forced to the relay B since it may not pass the rectifier X8.

Upon energization of the relay B, the contacts B–6 and B–7 are closed and provide a path through the contacts 13–I, 13R–I, B–7, B–6, rectifier X7 and resistance R2 which holds the coil Q of the stepping switch energised at low current. Also a path is provided through the contacts 13–I, 13R–I, B–7, B–6, 10–3, the wiper of level Q–B, contact 8S, the hatchway switches, the line SD and rectifier X9 to hold relay B energised. Thus the button 8Bu may be released while the coil Q remains energised and therefore prevents the stepping switch rotating further and holds it at a position corresponding to the button which was operated. The relay B also remains energised after the button has been released. The contacts B–1 (FIGURE 2) are closed and therefore the in-use lights are illuminated and the contacts B–2 and B–3 are opened thus isolating the car-here lights 1L to 20L and gongs 1–G to 20–G. The contacts B–4 are closed and the relay E is energised, thus closing contacts E–1 and self-holding contact E–2. At the same time as the signal passes through rectifier X9 to energise the relay B, the down relay D (FIGURE 3) is energised through the contacts 41–2 and U–6. The contacts U–6 are in series with the down relay D and the contacts D–6 are in series with the up relay U; when either of the relays U or D is de-energised its contacts U–6 or D–6 are closed but when the relays are energised, these contacts open. Thus if U is energised, U–6 is open and D may not be energised. Similarly if D is energised, D–6 is open and U may not be energised. This arrangement prevents shorts across the supply lines L1, L2 and L3. The energisation of the relay D closes the contacts D–1, D–2 and D–3 (FIGURE 2) and power is fed through the overload coils MOLR to the motor to cause the car to descend. At the same time the contacts D–4 are closed thereby energising the solenoid BS and lifting the brake shoe 26 from the disc 25. Moreover, the energising of the relay D closes the contacts D–5 and energises the relay T which opens the contacts T–2 and T–3 (FIGURE 3) and isolates the call buttons from the selector. The contacts T–1 are closed. As the car moves, its position will be indicated by the position lights which will be operated by the closing of the contacts S9–3 etc. by the cam 37 as the car passes the ninth floor.

When the car arrives at the eighth floor, the hatchway switch S8 will be operated and the contacts S8–1 and S8–2 will be opened. The opening of these contacts breaks the circuit through which the relays B and D are held energised and the relays become de-energised. The contacts D–1, D–2, D–3 are opened which stop the motor, also the contacts D–4 are opened which de-energises the solenoid BS and applies the brake to the motor. The de-energisation of the relay B opens the contacts B–6 which de-energises the coil Q of the stepping switch. The armature 45 therefore returns to its de-energised position under the influence of the spring 46 and closes the contacts Q–X. The closing of the contacts Q–X energises the coil Q through the contacts 13–I, 13R–I, Q–Y and Q–X and thus the switch is caused to step round since the contacts Q–X and the spring 46 constitute an interrupter circuit. The switch continues to step until the contacts Q–Y are opened by the lifting of the bar 49 by one of the protuberances 48. In this position the wipers are in the off position in FIGURE 3, each protuberance 48 corresponding to one off position of the three-armed wipers of the switch.

As the relay B is de-energised, the contacts B–2 and

B-3 close. The closing of the contacts B-2 causes the car-here light 8L to light since with the arrival of the car at the eighth floor, the contacts S8-4 have been closed. Even after the relay B has been de-energised and the contacts B-4 opened the relay E is maintained energised through the contacts E-2 and therefore, as the contacts B-3 are closed, the gong 8-G will sound since the contacts S8-5 are closed by the arrival of the car at the eighth floor. Also the contacts S8-3 will be closed and will illuminate the position light 8-P which will indicate the position of the car. The contacts B-1 will also open.

The opening of the contacts D-5 will break the circuit through the timing relay T but, during the time it has been energised, the condenser C1 (FIGURE 1) has become charged. When the contact D-5 is opened, the condenser C1 discharges through the coil of the relay T and a resistance R1 and the condenser is so arranged that as it discharges it maintains the relay T in an energised position for a predetermined interval of time. A convenient time interval would be from 7 to 8 seconds. While relay T remains energised, the push buttons are isolated since the contacts T-2 and T-3 are opened, so that there is an interval of time between the arrival of the car at its destination and the instant at which a push button may be operated to influence the selector to move the car to a different destination. This time interval is provided to allow the recipient at the destination to open the doors to remove the load. By opening the doors the energising circuit of the relay 41 is broken by opening the door-lock switches. If this delay arrangement were not provided, it would be possible for the car to move on to another destination before the recipient had had an opportunity to open the doors and remove the load.

When the relay T is de-energised, the contacts T-2 and T-3 close and place the push buttons back into circuit with the selector and the contacts T-1 open and extinguish the car-in-use lights.

When the doors are opened the relays E and 41 are de-energised due to the opening of the door-lock switches and, upon de-energisation of the relay E, the contacts E-1 open and the car-here gong 8-G is disconnected. Also, upon de-energisation of the relay 41 the contacts 41-5 and 41-9 open, and the contacts 41-6 and 41-8 close. This re-connects the push buttons so that upon operation of a push button the relay ODS is energised through contact T-3, the push button, and contacts 41-6 or 41-8. If the push button is connected to line L, the relay ODS (FIGURE 3) is energised through 41-8; and if the button is connected to line H, the relay is energised through 41-6. The energisation of the relay ODS closes the contacts ODS-1 and causes the open door buzzer ODB on the car to sound. The buzzer sounds only as long as there is pressure on the button.

Suppose now, that when the button 8B$u$ was pressed to call the car, the car was not at the tenth floor but was at the fifth floor. If this has been the case the hatchway switch contacts S5-1 and S5-2 in FIGURE 7 would have been open and the signal sent into the series of hatch-way switches from the contact 8B on the level Q-A of the stepping switch would pass to the top of the series, along the line SU, through the contacts 41-1 and D-6, and would energise the relay U. Energisation of the relay U would close the contacts U-1, U-2, U-3 which would start the motor to raise the car. The contacts U-4 would close to energise the solenoid BS to release the brake and the contacts U-5 would open to energise the relay T. The relay B would have been energised through the line SU, the rectifier X8 and the cancelling buttons CNB and CNBR. The subsequent operation when the car arrives at the eighth floor would be identical to that desscribed with reference to its downward travel except that the motor would stop through the opening of U-1, U-2 and U-3, the brake would be applied by the opening of U-4 and the circuit through the relay T opened by the opening of the contacts U-5, instead of by the opening of the corresponding contacts D-1, D-2, D-3, D-4 and D-5.

So far there has been described the operation of the circuit when the car has been called to a position below the tenth floor. If, however, the car had been called to the fifteenth floor and was then at the fifth floor, the operation of the circuit would have been as follows: the relay 41 is energised as before through the motor overload relay contacts MOLR-1, up-over-travel switch UOT, down-over-travel switch DOT, gate switches GA and RGA and door lock switches DL-1, DL-2, DL-3 . . . DL-40. Pressure on the push button 16B$u$ in FIGURE 4 causes relay 10 to be energised through contacts T-3, the button 15B$u$, the line H, and contacts 41-5 and B-5. The energisation of relay 10 closes the contacts 10-4 so that the coil Q of the stepping switch is energised through contacts 13-I, 13R-I, 10-4 and Q-X; this breaks the circuit at Q-X and the switch steps round in the manner hereinbefore described. When the switch arrives at the position such that the wiper on level Q-A is at contact 6B, Q is held energised, and therefore prevented from rotating, through the contacts T-3, the line B, the button 15B$u$, the contact 6B on the level A of the switch Q, the wiper of level A, the contacts T-2, the contcats 41-7, the rectifier X7 and the resistance R2. As before the coil Q is held energised on reduced current.

Simultaneously, the relay B is energised through the contacts T-3, the button 15B$u$, the contact 6B, the wiper on level A, contacts T-2, contacts 41-7, contacts 10-2, the wiper of level C, the contact 15S, the hatchway switch contacts S15-1, the line SU, the rectifier X8, and the cancelling buttons CNB and CNBR. The signal is prevented from flowing down through the hatch-way switches to the line SD since the presence of the car at the fifth floor opens the contacts S5-1 and S5-2. As before, the energisation of the relay B maintains the coil Q of the stepping switch energised through contacts 13-I, 13R-I, B-7, B-6, rectifier X7 and resistance R2, and maintains itself energised through contacts 13-1, 13R-I, B-7, B-6, 10-2, 15S, S15-1, line SU and rectifier X8 so that the button may be released. The closing of contacts B-8 holds the relay 10 energised through the contacts 10-1. The condenser C2 in parallel with the relay 10 is of sufficient capacity once it has been charged upon energisation of the relay 10 to prevent the relay becoming de-energised during the time between the opening of the contact B-5 and the closing of the contact B-8 as the relay B is energised. The condenser C2 discharges through the resistance R3 and the coil of the relay 10 to maintain it energised during the energisation of the relay B.

Simultaneously with the energisation of the relay B, the relay U is energised through the contacts 41-1 and D-6. The subsequent operation in the circuit is similar to that previously described except that when the relay B is de-energised the contacts B-8 will open and the relay 10 will be de-energised.

If the car had been above the fifteenth floor, say at the twentieth floor, when the button 15B$u$ was pressed, then the operation would have been the same except the signals fed into the series of hatch-way switches would have been fed out through the line SD since the contacts S20-1 and S20-2 of the hatch-way switch S20 would have been open. The relay D would have been energised through the contacts 41-2 and U-6 and the car would have descended.

There has now been described the sequence of operations which occurs when the car is called from one floor to another. If the car happens already to be at the floor at which a button is pressed then, since the first and second contacts of the hatch-way switch at that floor are both open, the signal fed into the series of switches between the contacts will be isolated so that neither the up nor the down relay will be energised and therefore the car will not move, nor will the relay B be energised. The stepping switch will return to the off position when the button is released since the contacts B-6 are not closed.

As long as the door at a landing is open, the door lock switch at that door will be open and the relay 41 will not be energised. If the relay 41 is not energised the contacts 41–7 are open and therefore the push buttons are isolated from the stepping switch. It follows, therefore, that as long as any set of doors is open it is impossible to place a further call and that a call may not be placed until the doors have been closed and the door lock contacts closed also. It has been explained above that, while the doors are open and the relay 41 de-energised, pressure on any of the push buttons sounds the open door buzzer ODB for as long as pressure is retained on the button.

After the car has arrived at the desired floor, and the doors have been opened and the gate of the car opened, the car may be loaded. Once the car has been loaded it may then be sent to any floor by dialing the required floor on one of the dials 35 or 36. So far, the embodiment of the invention described has used the arrangement of call buttons shown in FIGURE 4 and the arrangement of hatch-way switches shown in FIGURE 7. For this arrangement of switches, the floors are marked 1, 2, 3, 4, etc. to 20 and to despatch the lift to one of the floors 1 to 19 the corresponding digits are dialed on the dial, while for the floor 20 it is necessary to dial "0." The sequence of operations which occurs on dialing will now be described.

The car is considered to be at the eighth floor with the landing doors and the car gates open. As previously described, pressure on a call button under these circumstances causes the open door buzzer ODB to sound but does not register a call. A call to a number under 10 will first be considered; suppose the caller dials 5 on the dial 35 having the impule contacts 13–I and shunt contacts 13–S1 and 13–S2.

As has previously been described, when the dial is in the off position the impulse contacts 13–I are closed, the shunt contacts 13–S1 are open and the shunt contacts 13–S2 are closed. When the dial is moved from the off position the shunt contacts 13–S1 are closed and the shunt contacts 13–S2 are opened. Thus, as soon as the dial is moved from its off position, the contacts 13–S1 are closed and the relay B is energised. The energising of the relay B closes the contacts B–6 and B–7 and the coil Q is energised momentarily through the contacts 13–I, 13R–I, B–7 and Q–X, in this momentary energisation the whole voltage of the system is across the coil. As soon as the coil is energised, the contacts Q–X will be broken and the coil will then be energised through the contacts 13–I, 13R–I, B–7, B–6, the rectifier X7 and the resistance R2. In this position the coil Q will be energised at reduced voltage. The contacts 13–I will remain closed until the dial starts to return after it has been rotated.

As the dial returns, the contacts 13–I open once for each digit of the number dialed. Therefore, the stepping switch will be pulsed round a number of steps corresponding to the number of times the contacts 13–I open and therefore to a position corresponding to the digit dialed. Each time 13–I closes, Q is energised through the contacts 13–I, 13R–I, Q–Y or B–7, and Q–X, and when Q–X is opened, current flows to the coil Q through B–6, X7 and R2 and Q is held energised. Conversely, every time 13–I is opened the circuit is interrupted, the coil Q is de-energised and the pawl 44 steps on the ratchet wheel one step. Thus, if the digit 5 had been dialed the wipers of the stepping switch would have stepped round until the wiper on level Q–A was in contact with the contact 5B.

When the dial returns to the off position, the contacts 13–S1 will open but the relay B will remain energised through the contacts B–8 and 41–3 and the cancelling buttons CNB and CNBR. After the call has been placed, the car gate and the landing doors are closed. With the closing of the gate and the shutting of the doors, the contacts GA will close and the door lock switches will also close so that the relay 41 will be energised. During the stepping of the switch, the wiper at level Q–B will have come into contact with the contact 5S and upon energisation of the relay 41 contacts 41–3 are opened and the current therefore flows through contacts 13–I, 13R–I, Q–Y, B–6, 10–3, the wiper on level Q–B, the contact 5S, the hatch-way switches, the line SD, since the car is at the eighth floor, the rectifier X9, and the cancelling buttons CNB, CNBR to the relay B. If the car had been below the floor called the signals fed into the hatch-way switches would have passed through line SU, the rectifier X–8 and the cancelling buttons to the relay B. As the current is forced through the above-mentioned path, it will also pass through the contacts 41–2, and U–6 to energise the relay D so that the car will move down from the eighth floor to the fifth floor in a manner identical to that previously described when a call had been placed by pressing a call button. The operation of the circuit on arrival of the car at the floor is also the same as has previously been described.

If the car had been below the floor called, then the signals from the hatchway switches would have been fed along the line SU through the contacts 41–1 and D–6 and would have energised the relay U so that the car would move upwardly.

If it had been desired to send the car to floor one, the digit 1 would have been dialed and the stepping switch would be pulsed round one step only. It will be seen that the first contact on the level Q–B of the stepping switch is not connected so that only the third and fourth levels of the stepping switch would be connected. The third level wiper would be connected to the contact 1S and the fourth level wiper to one side of the contacts 41–4. When the dial reached the off position, the closing of the contacts 13–S2 would cause the relay 10 to be energised through the contacts 13–S2, 13R–S2, level Q–D and contacts 41–4. The operation of the relay 10 would close the contact 10–2 and open the contacts 10–3 thus connecting the hatch-way switches to the third level Q–C instead of to the second level Q–B. It will be seen that the hatch-way switch S1 is connected to the contact 1S on level Q–C. If no further dialing was done, then, when the doors and gates were closed the car would proceed to the first floor.

If, however, a further digit was dialed, the stepping switch Q is pulsed round as before but in this instance it starts from a position in which the wiper arm on level Q–C is already at the second contact. Thus, the wiper at Q–C will occupy a position corresponding to the digit one greater than the second digit which is dialed. Thus if the digits 1 and 6 are dialed, the wiper on the level Q–C will be in contact with the contact 16S which is the seventh contact. The contact 16S is connected between the contacts S16–1 and S16–2 of the hatch-way switch of the sixteenth floor, the hatch-way switches being wired to compensate for the extra step which is introduced into the position of the stepping switch when more than one digit is dialed.

If the digits 10 are dialed then the stepping switch will step eleven times so that the wiper originally in contact with the contact 10S on the level Q–C before dialing took place will be in contact with no contact and the next succeeding wiper arm will be in contact with the contact 10S so that the car will proceed to the tenth floor in a manner similar to that above described. When the car gates and landing doors are closed after dialing the digit 1 or after dialing a two-digit number beginning with 1, the relay 10 remains energised and the car runs to the desired floor as described previously for a call placed by a call button connected to the line H.

A call which has been placed may be cancelled any time before the gates and doors are shut by a momentary pressure on either of the cancelling buttons CNB or CNBR. Such a pressure breaks the circuit through the relay B and allows the stepping switch to step round to the off position through the contacts 13–I, 13R–I, Q–Y and Q–X. Moreover, the opening of the contacts B–8 de-energises the relay 10 if it was previously energised.

It will be appreciated that since the dials 35, 36 are placed in series and the contacts 13–I and 13R–I and the associated shunt contacts are also placed in series, a call may be placed in a similar manner with the dial 36.

The invention has been described with reference to FIGURES 4 and 7 which show wiring for a building having twenty floors and in which the floor markings are 1, 2, 3, 4, etc. to 20. For the floors 1 to 19 the corresponding digits are dialed, while for floor 20, "0" is dialed. FIGURES 5 and 8 show alternative means of wiring the push buttons and hatch-way switches respectively for a twenty floor building in which the floor markings are, "Basement," 1, 2, 3, etc. to 19. In this arrangement "0" is dialed for the Basement and the appropriate digits for any of the floors 1 to 19. In FIGURES 6 and 9 are shown another alternative method of wiring the call buttons and hatch-way switches respectively for a twenty floor building in which the floor markings are, "Basement," "Ground Floor," 1, 2, 3, etc. to 18. For the floors 1 to 18 the appropriate digits are dialed while for the Basement "19" is dialed and for the ground floor "0" is dialed. The operation of the system with either of the alternative wiring arrangements is the same as that that has been previously described in relation to FIGURES 4 and 7.

The invention has been described with reference to a dumbwaiter having front and rear gates and therefore front and rear landing doors. Only one set of push buttons have been shown in each of FIGURES 4, 5 and 6 but in practice a second push button would be wired in parallel with each of the push buttons shown, one of the push buttons being for the front door opening on the floor, and the other of the push buttons being for the rear door opening on the floor. These second push buttons have been omitted to avoid complicating the drawings.

The system could, of course, be used for a building having ten floors or less in which case the levels Q–C and Q–D on the stepping switch would not be required. Moreover, the relay 10 and the contacts 41–4, 41–5, 41–6 and B–5 would also not be required. The contacts 13–S2 and 13R–S2 on the dials would not be required and contacts 13–S1 and 13R–S1 would be wired in parallel.

Moreover, only a single dial need be used in which case the contacts 13R–I, 13R–S1, 13R–S2 would not appear in the circuit. Only a single set of doors and car gates need be provided if desired.

If front and rear entrances are provided at one or more floors and the landing doors and car gates are power operated, separate numbers can be used for front and rear entrances which are on the same floor. Then, by dialing the appropriate number, the desired door, either front or rear, can be made to open when the car arrives at its destination. Similarly, when such a system is provided, only the signals, such as the car-here lights and car-here gongs, for the desired entrance will be operated when the car arrives.

Although the invention has been described with reference to a control system for a dumbwaiter it will be appreciated that it could equally well be used for a passenger elevator or other system in which a car is movable by traction means between a plurality of spaced apart stations.

It will also be appreciated that although the invention has been described with reference to a four-level stepping switch, more extensive types of stepping switches or a pair of stepping switches may be used with which the capacity of the system could be increased to deal with more than twenty floors. The principle of operation would be the same as has already been described.

In the specification and claims, the term "traction means" is used to include any convenient means of moving a car between stations and includes, for example, hydraulic means, and chain and sprocket means or a cable wound round a drum, the drum or sprocket being driven by a prime mover.

It will be understood that the form of the invention herewith shown and described is a preferred example and various modifications can be carried out without departing from the spirit of the invention or the scope of the appended claims.

What we claim as our invention is:

1. An electrical control system for a car movable by traction means between a plurality of spaced apart stations, the system including a manually operable impulse-sending device on the car, a multi-position selector arranged to index from an initial position and operable by the sending device when connected thereto, car call means at each station, each call means being associated with a predetermined position of the selector, an impulse-producing circuit common to all the call means and operable to deliver impulses to index the selector when connected thereto, the operation of said impulse-producing circuit being initiated to cause the selector to index by operation of any car call means when the selector is in its initial position and connected thereto, said circuit continuing to operate to index the selector until its operation is terminated as a result of the selector reaching the first position it comes to during its indexing which is associated with an operated car call means, the selector being retained in said first position, means controlling the connection of the selector to the impulse-sending device and the impulse-producing circuit, sensing means responsive to the positions of both the car and the selector, control means interposed between the sensing means and the traction means and energisable to control the latter to move the car, upon operation of either the sending device or the car call means to a station corresponding to the position assumed by the selector as a result of said operation, and means to return the selector to its initial position after the car has arrived at its destination.

2. An electrical control system according to claim 1 wherein each car call means comprises two normally open contacts which are closed during the operation of the means, the closing of one of said contacts initiating operation of the impulse-producing circuit and the other of the contacts being connected to a position of the selector, the arrival of the selector at such position terminating the operation of the impulse-producing circuit by a circuit including said position and said other contact.

3. An electrical control system according to claim 1 wherein the multi-position selector comprises first and second selector elements associated with first and second levels of the selector and ganged to index in synchronism, the first level of said selector being connected to said call means whereby the operation of the impulse-producing circuit is terminated when the selector reaches said first position and the second level of the selector being connected to the sensing means for feeding a signal to such means indicating the position of the selector.

4. An electrical control system according to claim 3 wherein the multi-position selector includes first, second and third selector elements associated with first, second and third levels of the selector and ganged to index in synchronism, each level having a predetermined number of contact positions through which its associated element can index, there being more stations than there are contact positions on the first level, the call means of at least some of the stations being wired in parallel with call means at other of said stations and forming pairs of parallel-wired call means so that all said call means are connected to the contact positions on the first level, the contact positions of the second and third levels being connected to the sensing means for feeding a signal to such means indicating the position of the selector, and means to differentiate between signals received from one or other of those call means wired in parallel so that for one call means of each of said parallel-wired pairs of call means a signal is fed out through the second level of the selector and for the other call means of said parallel-wired pair of call means the signal is fed out through the third level of the selector.

5. An electrical control system according to claim 4 wherein the means to differentiate between the call means of each parallel-wired pair of call means comprises a relay which is actuated when a predetermined call means of any of said pairs is operated, actuation of the relay diverting the signal from the second level of the selector to the third level thereof.

6. An electrical control system according to claim 3 wherein the sensing means includes a switch at each of the stations, the switches being wired in series and being normally closed, means responsive to the presence of the car at a station to open the switch at that station, said selector-position indicating signal being fed into the series of switches at the station corresponding to that called, the signal passing through a different end of the series depending upon the relative positions of the switch opened by the presence of the car and the station called; and wherein the control means includes two elements, one element being energisable to cause the traction means to move the car in one direction, the other element being energisable to cause the traction means to move the car in the opposite direction, the one element being connected to one end of the series of switches and the other element being connected to the other end of the series of switches, the elements being arranged to energise the traction means appropriately on receipt of a signal from the series.

7. An electrical control system according to claim 6 including two switches at each station, all of such switches being wired in series and being normally closed and wherein the means responsive to the presence of the car at a station is arranged to open both switches at that station and wherein the selector-position indicating signal is fed into the series of switches at said corresponding station between the two switches associated with said station.

8. An electrical control system according to claim 6 wherein the car is stopped at its destination after movement by opening, by its presence at its destination, a switch or switches in said series and thereby de-energizing the control means.

9. An electrical control system according to claim 1 including time delay means to prevent the operation of any of the car call means from influencing the selector for a predetermined time interval after the car has arrived at its destination in response to operation of the selector.

10. An electrical control system according to claim 9 wherein the time delay means includes a condenser which is charged when the control means is energised and is discharged through the coil of a relay upon de-energisation of the control means upon the arrival of the car at its destination to maintain the relay energised to isolate the call means from the selector for said predetermined time interval.

11. An electrical control system according to claim 1, including means on the car for cancelling a call placed by the impulse-sending device after the call has been made but before the car has started to move in response to the call.

12. An electrical control system according to claim 1, wherein the means for returning the selector to its initial position after the car has arrived at its destination includes means operative on de-energisation of the control means upon the arrival of the car at its destination to energise the impulse-producing circuit to index the selector, and wherein means are provided for terminating the operation of said circuit when the selector has returned to its initial position.

13. An electrical control system according to claim 1 wherein the car includes front and rear openings and two impulse-sending devices, one sending device being located adjacent to each of said openings.

14. An electrical control system according to claim 1 including movable doors for gaining access to the interior of the car and wherein means are provided to disconnect the car call means from the selector when any of said doors are open.

References Cited
UNITED STATES PATENTS 2,664,971  1/1954  Crane _____ 187—29

ORIS L. RADER, *Primary Examiner.*

T. LYNCH, *Assistant Examiner.*